Oct. 16, 1934.  M. GOBERT  1,976,933
RECOVERY BY COLD OF A CONSTITUENT IN A GAS MIXTURE
Filed March 3, 1931
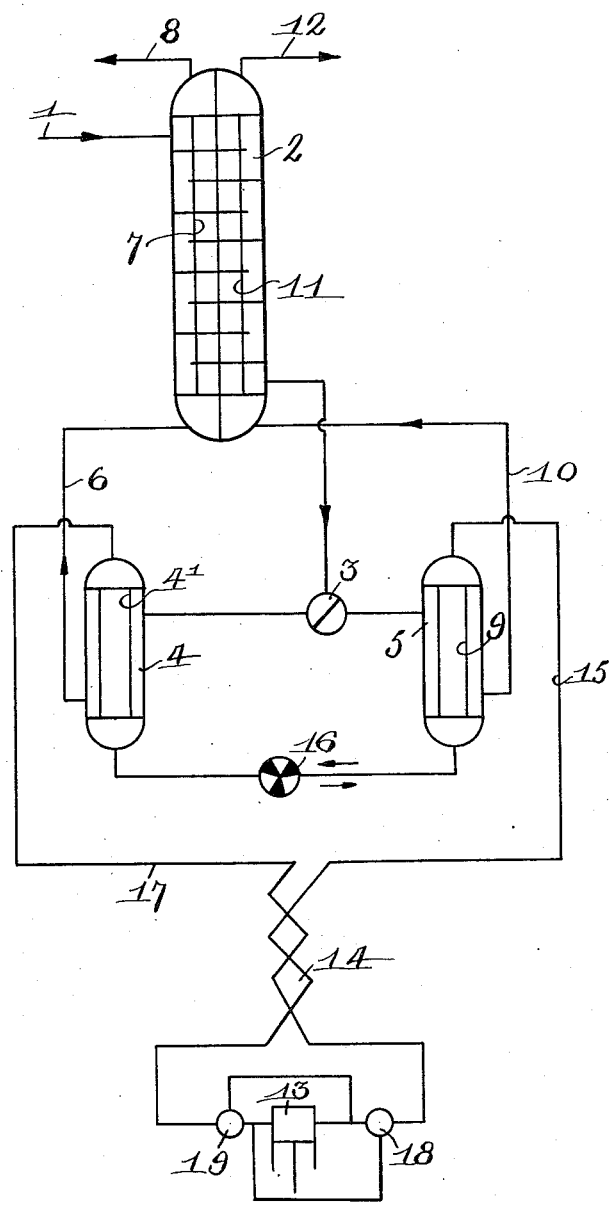
Maurice Gobert Inventor
By
Attorneys Patented Oct. 16, 1934

1,976,933

UNITED STATES PATENT OFFICE 1,976,933

RECOVERY BY COLD OF A CONSTITUENT IN A GAS MIXTURE

Maurice Gobert, Chaville, France, assignor to L'Air Liquide, Societe Anonyme pour L'Etude & L'Exploitation des Procedes Georges Claude, Paris, France Application March 3, 1931, Serial No. 519,873
In Germany March 4, 1930

8 Claims. (Cl. 62—175.5)

This invention relates to a process for recovering by cold a constituent from a gaseous mixture and has among its objects to utilize an auxiliary gas which performs successively the condensation of the constituent from the gaseous mixture and the vaporization of said constituent condensed in a preceding operation, in two distinct heat exchange regions, through which the gaseous mixture to be treated alternately circulates.

When submitting gas mixtures to separation by cold, some constituents have heretofore been eliminated in the solid state; however, the deposits thus formed will obviously become a source of rapid clogging of the apparatus. These deposits therefore have to be taken away and various methods have already been proposed for the purpose, which primarily consists in causing relatively hot gases, e. g. the gas itself to be separated out or some of its separated constituents, to flow through the clogged apparatus.

Such processes are unsuitable in that the cold of the gases used to clear away the solids is not utilized, or utilized to an insufficient degree.

This invention contemplates a process wherein the recovery by cold of one constituent in the gas mixture is carried out by condensing the said constituent into the liquid or the solid state, then evaporating or subliming the same, such operations being performed in a pair of apparatus each of which is adapted to successively operate as a condenser and an evaporator; the process is characterized in that a fluid flowing preferably under pressure and in a closed cycle is used to carry out the condensation and the evaporation or sublimation of the desired constituent successively in two apparatus having alternative functions.

An embodiment of the invention as applied to the separation of acetylene from a mixture of acetylene and such a difficultly condensable gas as hydrogen will now be described with reference to the appended diagram.

The gas mixture fed in at 1, e. g. at the ordinary pressure, is directed first towards a heat exchanger 2 comprising two chambers through each of which one of the separated products i. e. acetylene or hydrogen, is alternately caused to flow.

The gas mixture thus cooled is fed through the distributor 3 into either the exchanger 4 or the exchanger 5, adapted to operate successively as a condenser and an evaporator for acetylene.

In the drawing 4 and 5 denote two exchangers in which are alternately carried out the condensation of a constituent from the gaseous mixture and the vaporization of said condensed constituent. 2 is an exchanger in which circulate in indirect contact the vaporized constituent and the gaseous mixture before the condensation of this constituent. The fluid which causes successively the condensation of the constituent from the gaseous mixture and the vaporization of said condensed constituent circulates in a cycle through the exchangers 4 and 5 by means of the compressor 13. 14 is an exchanger causing the heat exchange between the compressed fluid and the same fluid before its compression.

Assuming the gas mixture is directed towards the exchanger 4 operating as a condenser, said gas mixture will flow therethrough around the tubes 4' of a tube nest through which such fluid flowing in a cycle as will be dealt with hereinafter is passed. The acetylene will deposit in the solid form around the said tubes while the hydrogen flows out through pipe 6 into the tubes 7 of the left hand chamber of the exchanger 2 which it leaves at 8.

By this time, the exchanger 5 will operate as an evaporator, and the acetylene which has deposited in the solid state around the tubes 9 of the exchanger 5 becomes evaporated as a result of the flow through the said tubes 9 of the fluid circulating in a cycle.

Such acetylene will pass through pipe 10 into the tubes 11 of the tube nest in the right hand chamber of the heat exchanger 2 wherefrom it finally escapes at 12.

The concomitant condensation and evaporation of the acetylene in the respective exchangers 4 and 5 are obtained by means of a fluid under pressure circulating in a closed cycle, such fluid being, for instance, nitrogen.

For that purpose, a compressor 13 forces the said nitrogen through exchanger 14 and piping 15 into the tubes 9 of the exchanger 5 where it will produce the evaporation of the acetylene; the nitrogen thus cooled flows through a valve 16 or an expansion machine with external working and intended to produce the cold necessary to compensate the losses of cold in the apparatus, after which it flows through the tubes 4' of the exchanger 4 where it effects the condensation of the acetylene and becomes heated, and finally returns through pipe 17 and exchanger 14 back to compressor 13.

After a certain time the reversing valves 3, 18 and 19, together with the expansion valve 16, are turned over automatically. In this manner, the gas mixture is directed towards the exchanger 5 which now operates as a condenser while the exchanger 4 operates as an evaporator; the hydrogen will thus flow out at 12 and the acetylene at 8. At the same time the flow of auxiliary fluid is reversed and follows the direction 14—17—4—5—15 and back to 14.

This arrangement does away with any danger of clogging as the cold acetylene will always circulate outside the tubes. Moreover, the heat exchanges between the gases will take place within the condensers at widely different pressures, which favours heat transmission.

In this manner, not only does the auxiliary fluid act as an agent of transmission but it also serves to bring the apparatus down to working temperature, whereafter, working conditions being established, it will economically compensate the unavoidable losses of cold as a result of its expansion with or without external working.

It is to be noted that as the gases to be dealt with may also be circulated at a pressure equal to or lower than that of the atmosphere, one is enabled by operating under such pressure conditions to avoid any danger of liquid acetylene formation in the case described as an example.

What I claim is:

1. A process for recovering by cold a constituent from a gaseous mixture which comprises, alternately circulating the said gaseous mixture in two regions spatially remoted for indirect heat exchange with an auxiliary gas, condensing a constituent of said gaseous mixture in one of the said regions by the said auxiliary gas, in a cold state, compressing the said gas, simultaneously with the above condensing operation vaporizing in the other region by the said compressed gas the same constituent of the gaseous mixture condensed at the previous passage of said gaseous mixture in the said other region and alternately reversing the direction of the auxiliary gas from one region to the other region simultaneously with the alternance of passage of the gaseous mixture in said regions for interchanging the condensing and vaporizing operations in said regions.

2. A process for recovering by cold a constituent from a gaseous mixture which comprises, alternately circulating the said gaseous mixture in two regions spatially remoted for indirect heat exchange with an auxiliary gas, condensing a constituent of said gaseous mixture in one of the said regions by the said auxiliary gas, in a cold state, compressing the said gas, simultaneously with the above condensing operation vaporizing in the other region by the said compressed gas the same constituent of the gaseous mixture condensed at the previous passage of said gaseous mixture in said other region, circulating the said vaporized constituent in heat exchange with the gaseous mixture to be submitted to the condensing operation and alternately reversing the direction of the auxiliary gas from one region to the other region simultaneously with the alternance of passage of the gaseous mixture in said regions for interchanging the condensing and vaporizing operations in these regions.

3. A process for recovering by cold a constituent from a gaseous mixture which comprises alternately circulating the said gaseous mixture in two regions spatially remoted for indirect heat exchange with an auxiliary gas, condensing a constituent of said gaseous mixture in one of the said regions by the said auxiliary gas, in a cold state, compressing the said gas, simultaneously with the above condensing operation vaporizing in the other region by the said compressed gas the same constituent of the gaseous mixture condensed at the previous passage of said gaseous mixture in the said other region, expanding the said compressed gas and utilizing the said expanded gas as gas in a cold state for the above condensing operation, recompressing the said gas after the condensing operation, this auxiliary gas thus circulating in a closed circuit, and alternately reversing the direction of the circulation of said gas in its circuit for interchanging the condensing and vaporizing operations in the heat exchange regions between the gaseous mixture and the auxiliary gas.

4. A process for recovering by cold a constituent from a gaseous mixture as in claim 3, in which the expansion of the auxiliary gas after its indirect exchange with the constituent of the gaseous mixture submitted to the vaporization is utilized for covering the losses of cold in the said process.

5. A process for recovering by cold a constituent from a gaseous mixture which comprises, alternately circulating the said gaseous mixture in two regions spatially remoted for indirect heat exchange with an auxiliary gas, condensing a constituent of said gaseous mixture in one of the said regions by the said auxiliary gas, in a cold state, circulating said gas in indirect contact with previously compressed portions of said gas, compressing it, circulating it under the compressed state for the just mentioned indirect contact, simultaneously with the above condensing operation, vaporizing in the other region by the said compressed gas the same constituent of the gaseous mixture condensed at the previous passage of said gaseous mixture in the said other region and alternately reversing the direction of the auxiliary gas from one region to the other region simultaneously with the alternance of passage of the gaseous mixture in said regions for interchanging the condensing and vaporizing operations in said regions.

6. A process for recovering by cold acetylene from a gaseous mixture containing it which comprises, alternately circulating the said gaseous mixture in two regions spatially remoted for indirect heat exchange with an auxiliary gas, condensing this acetylene in a solid state under a pressure which is at the utmost the atmospheric pressure in one of the said regions by the said auxiliary gas, in a cold state, compressing the said gas, simultaneously with the above condensing operation vaporizing in the other region by the said compressed gas the solid acetylene condensed at the previous passage of said gaseous mixture in the said other region and alternately reversing the direction of the auxiliary gas from one region to the other region simultaneously with the alternance of passage of the gaseous mixture in said regions for interchanging the condensing and vaporizing operations in said regions.

7. A process for recovering by cold acetylene from a gaseous mixture containing it which comprises, alternately circulating the said gaseous mixture in two regions spatially remoted for indirect heat exchange with nitrogen, condensing this acetylene in a solid state under a pressure which is at the utmost the atmospheric pressure in one of the said regions by the said nitrogen, in a cold state, compressing the said nitrogen, simultaneously with the above condensing operation vaporizing in the other region by the said compressed nitrogen the solid acetylene condensed at the previous passage of said gaseous mixture in the said other region and alternately reversing the direction of the said nitrogen from one region to the other region simultaneously with the alternance of passage of the gaseous mixture in said regions for interchanging the condensing and vaporizing operations in said regions.

8. A process for recovering by cold acetylene from a gaseous mixture containing it which comprises, alternately circulating the said gaseous mixture in two regions spatially remoted for indirect heat exchange with nitrogen, condensing this acetylene in a solid state in one of the said regions by the said nitrogen, in a cold state, compressing the said nitrogen, simultaneously with the above condensing operation vaporizing in the other region by the said compressed nitrogen the solid acetylene condensed at the previous passage of said gaseous mixture in the said other region, expanding the said compressed nitrogen and utilizing the said expanded nitrogen in a cold state for the above condensing operation, recompressing the said nitrogen after the condensing operation, this nitrogen thus circulating in a closed circuit and alternately reversing the direction of the circulation of said nitrogen in its circuit for interchanging the condensing and vaporizing operations in the heat exchange regions between the gaseous mixture containing acetylene and the nitrogen.

MAURICE GOBERT.